United States Patent Office 3,429,599
Patented Feb. 25, 1969

3,429,599
BALL JOINT
Andreas Schmidt, Osterath-Bovert, Germany, assignor to A Ehrenreich & Cie, Dusseldorf-Oberkassel, Germany
Filed Aug. 17, 1965, Ser. No. 480,342
Claims priority, application Germany, Aug. 19, 1964, E 20,394
U.S. Cl. 287—87  7 Claims
Int. Cl. F16c *11/06;* F16j *15/48, 15/32*

ABSTRACT OF THE DISCLOSURE

The present invention concerns a ball joint the housing of which has a peripheral annular groove provided in that end portion thereof which is adjacent the stud, while bellows means having one end portion surrounding said stud are in sealing engagement therewith whereas the other end portion in the form of a lip engages the said peripheral annular groove, said lip having an outer contour corresponding substantially to the inner contour of the peripheral annular groove in the housing.

Furthermore, said bellows means is provided with an outer annular groove in said lip while a spring ring located in said outer annular groove extends over a length slightly less than twice the circumferential length of said annular groove in said lip, said spring ring having a width in excess of its height and having a substantially rectangular cross section corrseponding to the cross section of said annular groove in said lip. The said spring ring in the form of a helical coil comprises a complete winding and two partial windings respectively located on opposite sides of said complete winding and having their free ends circumferentially spaced from each other and located in planes extending substantially perpendicularly to the axis of said spring ring.

---

The present invention relates to a ball joint, especially for motor vehicles, which is provided with a sealing bellows engaging on one hand the ball stud of said joint and on the other hand being secured in a circumferential groove of the housing for said ball joint.

The connection of said bellows to the housing and/or the ball stud may be effected in various manners, for instance due to its own tension or by a wire wound around, by an elastic clamping ring or by a spring ring with a round cross section. None of these ways of connecting the bellows to the housing is entirely satisfactory. When employing a wire, the mounting operation is too expensive, whereas with the employment of an elastic clamping ring the life of the connection is somewhat limited. The tension of a spring ring having a round cross section is usually not sufficient.

For the above reasons, it has been suggested to employ a spring ring of steel having a width equalling a multiple of its height. The width of the annular groove of the bellows into which the ring is inserted has to correspond approximately to twice the height of the ring because at the overlapping area, the two ring ends when viewed in axial direction are located one above the other. This, however, means that the width of the annular groove is too great for the simple height of the ring. The ring can be displaced in axial direction within the groove, and the bellows will not always properly seal.

It is, therefore, an object of the present invention to provide a ball joint with sealing bellows which will overcome the above mentioned drawback.

It is another object of this invention to provide a ball joint as set forth in the preceding paragraph, in which the bellows will be sealed to the housing in a simple and reliable manner and the connection will have a long life.

These and other objects and advantages of the invention will appear more clearly from the following specification in connection with the accompanying drawing, in which.

Figure 1:
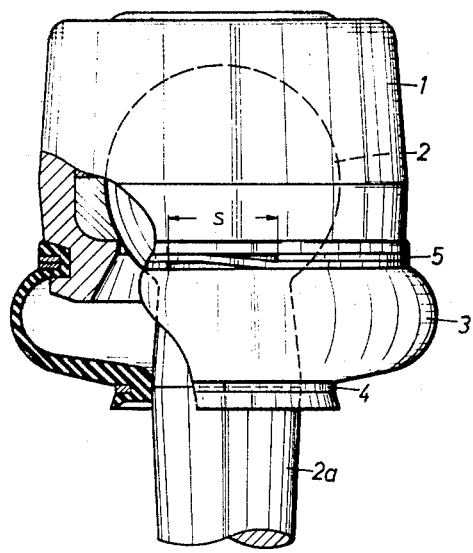
FIG. 1 illustrates partly in section and partly in view a ball joint according to the present invention.
Figure 2:
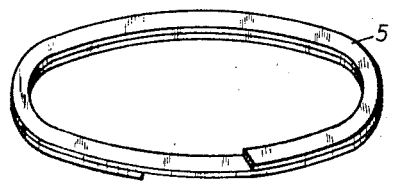
FIG. 2 is a perspective view of a clamping ring according to the present invention in non-mounted position.

The ball joint according to the present invention is characterized primarily in that the length of the clamping ring when mounted on the bellows is less than twice the circumference of the groove in the housing into which the bellows is pressed by the clamping ring. In this way, the width of the groove is almost over the entire circumference of the groove completely filled in by the clamping ring.

More specifically, referring to the drawing, the ball joint illustrated therein comprises a ball head 2 with a stud 2a connected thereto. The ball joint is surrounded by a housing 1 from which protrudes the ball stud 2a. The annular gap between housing 1 and stud 2a is protected against the entry of soil and humidity by a sealing bellows 3. Bellows 3 on one hand closely engages stud 2a and more specifically is connected thereto by means of spring ring 4 clamping the respective bellows end against stud 2a. A second clamping ring 5 is employed for connecting the other bellows end to the housing 1.

As will be seen from the drawing, the total length of spring ring 5 in mounted position on bellows 3 is slightly less than twice the circumference of the groove in which it is located. FIG. 1 also shows that the width of the groove is fully taken up by spring ring 5 over almost the entire circumference of the groove with the exception of a section *s*. However, over this section the spring ring extends in a diagonal manner over the width of the groove from the top to the bottom so that ring 5 is non-displaceably held within the range *s*. The doubling of the clamping ring has the further advantage that the ring tension is increased which means that the sealing effect of the bellows is improved. While the range *s* may vary slightly in length, according to a practical embodiment of the present invention, the range *s* may be three-fourths of the diameter of the stud of that area where it merges with the ball head. Furthermore, the length of the spring ring is advantageously one and three-fourths or more of the double circumferential length of the groove in which the ring is to be placed.

It is, of course, to be understood that the present invention is, by no means, limited to the particular arrangement shown in the drawing but also comprises any modifications within the scope of the appended claims.

What I claim is:

1. A ball joint, especially for motor vehicles, which includes: a ball head, a housing surrounding said ball head, a stud connected to said head and protruding from said housing, said housing having a peripheral annular groove provided in that end portion thereof which is adjacent said stud, bellows means having one end portion surrounding said stud in sealing engagement therewith and having its other end portion in the form of a lip engaging said peripheral annular groove, said lip having an outer contour corresponding substantially to the inner contour of said peripheral annular groove, said bellows means being provided with an outer annular groove in said lip, a spring ring located in said outer annular groove in said lip and extending over a length slightly less than twice the circumferential length of said annular groove in said lip, said spring ring having a width in excess of its height and having a substantially rectangular cross-section corresponding to the cross-section of said annular groove in said lip, said spring ring being in the form of a helical coil and comprising a complete winding and two partial windings respectively located on opposite sides of said complete winding and having their free ends circumferentially spaced from each other and located in planes extending substantially perpendicularly to the axis of said spring ring, that portion of said complete winding which is located between the free ends of said partial windings extending in a plane inclined with regard to the planes in which the free end portions of said partial windings are located, said spring ring continuously tending to decrease its inner diameter to thereby radially press said lip tightly into said peripheral annular groove while simultaneously preventing said lip from being axially displaced and holding the same firmly in said peripheral annular groove.

2. A ball joint according to claim 1, in which said peripheral annular groove has one side inclined relative to the other.

3. A ball joint according to claim 1, in which the bias of said spring ring is such that when permitted to fully relax the spring has more than two complete windings while the free ends thereof overlap each other.

4. A ball joint according to claim 1, in which the width of said spring ring is a multiple of its height.

5. A ball joint according to claim 1, in which the length of said spring ring mounted on said bellows means is longer than one and three-fourths of the double circumferential length of said groove.

6. A ball joint according to claim 1, in which the spacing of the ends of said spring ring mounted on said bellows means is slightly less than the diameter of the stud portion adjacent said ball head.

7. A ball joint according to claim 1, in which the spacing of the ends of said spring ring mounted on said bellows means is nearly three-fourths of the diameter of the stud portion adjacent said ball head.

References Cited

UNITED STATES PATENTS

| | | | |
|---|---|---|---|
| 2,232,039 | 2/1941 | Von Brehoist | 277—157 |
| 2,450,425 | 10/1948 | Frisby | 85—8.8 |
| 3,052,477 | 9/1962 | Parker | 287—90 |

FOREIGN PATENTS

| | | |
|---|---|---|
| 1,226,195 | 2/1960 | France. |

CARL W. TOMLIN, *Primary Examiner.*

ANDREW V. KUNDRAT, *Assistant Examiner.*

U.S. Cl. X.R.

277—212; 287—90